United States Patent [19]

Graham et al.

[11] Patent Number: 4,637,620
[45] Date of Patent: Jan. 20, 1987

[54] TWO STAGE CHUCK

[76] Inventors: Merton J. Graham, 253 Fairground Rd., North Springfield, Vt. 05150; Paul H. Miller, 61 Daffodil La., Meriden, Conn. 06450

[21] Appl. No.: 646,804

[22] Filed: Sep. 4, 1984

[51] Int. Cl.⁴ .............................................. B23B 31/00
[52] U.S. Cl. .............................. 279/1 DA; 279/1 DC; 279/110
[58] Field of Search .............. 279/1 DA, 1 DC, 1 G, 279/1 L, 2 R, 110, 119, 2 A

[56] References Cited

U.S. PATENT DOCUMENTS

| | | | |
|---|---|---|---|
| 2,394,841 | 2/1946 | Bugg | 279/1 DA |
| 2,703,242 | 3/1955 | Sloan et al. | 279/1 DA |
| 3,437,342 | 4/1969 | Mann | 279/1 G |

FOREIGN PATENT DOCUMENTS

| | | | |
|---|---|---|---|
| 19612 | 2/1984 | Japan | 279/110 |
| 825763 | 12/1959 | United Kingdom | 279/1 DA |
| 611728 | 6/1978 | U.S.S.R. | 279/1 L |
| 804347 | 2/1981 | U.S.S.R. | 279/1 L |

Primary Examiner—Z. R. Bilinsky
Assistant Examiner—Daniel W. Howell
Attorney, Agent, or Firm—DeLio & Associates

[57] ABSTRACT

A chuck assembly having jaws to grip an annular workpiece on its outer periphery while machining other surfaces including a face and bore and an expansible element to grip the bore surface of the annular workpiece while machining the outer surfaces and a face, with mechanism for actuating the jaws and expansible element alternately, the parts supporting the jaws and expansible element comprising an assembly adapted for mounting on the headstock of a lathe to permit machining of the work-piece by tools carried on the tool holders normally present in a lathe.

5 Claims, 9 Drawing Figures

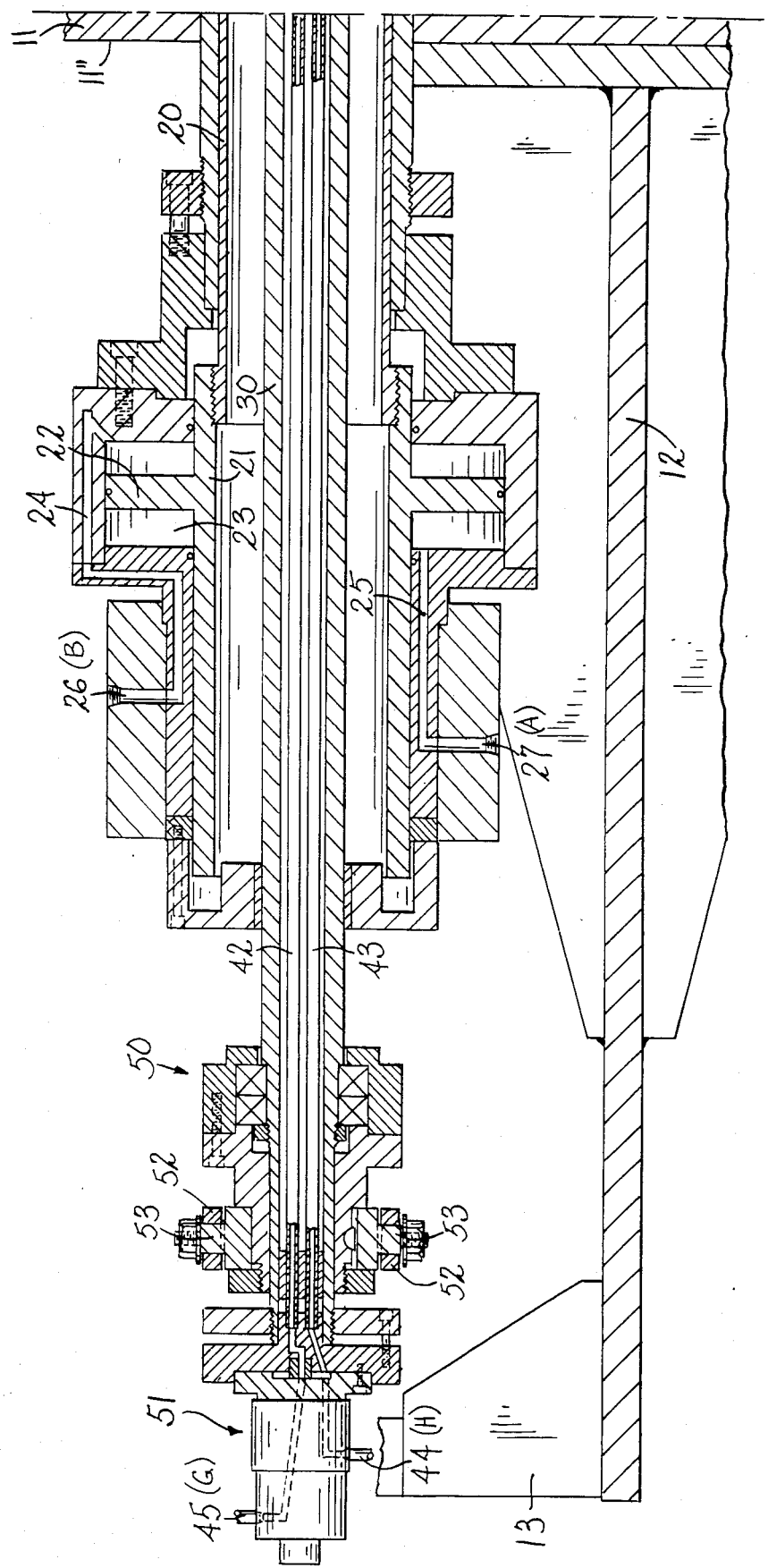

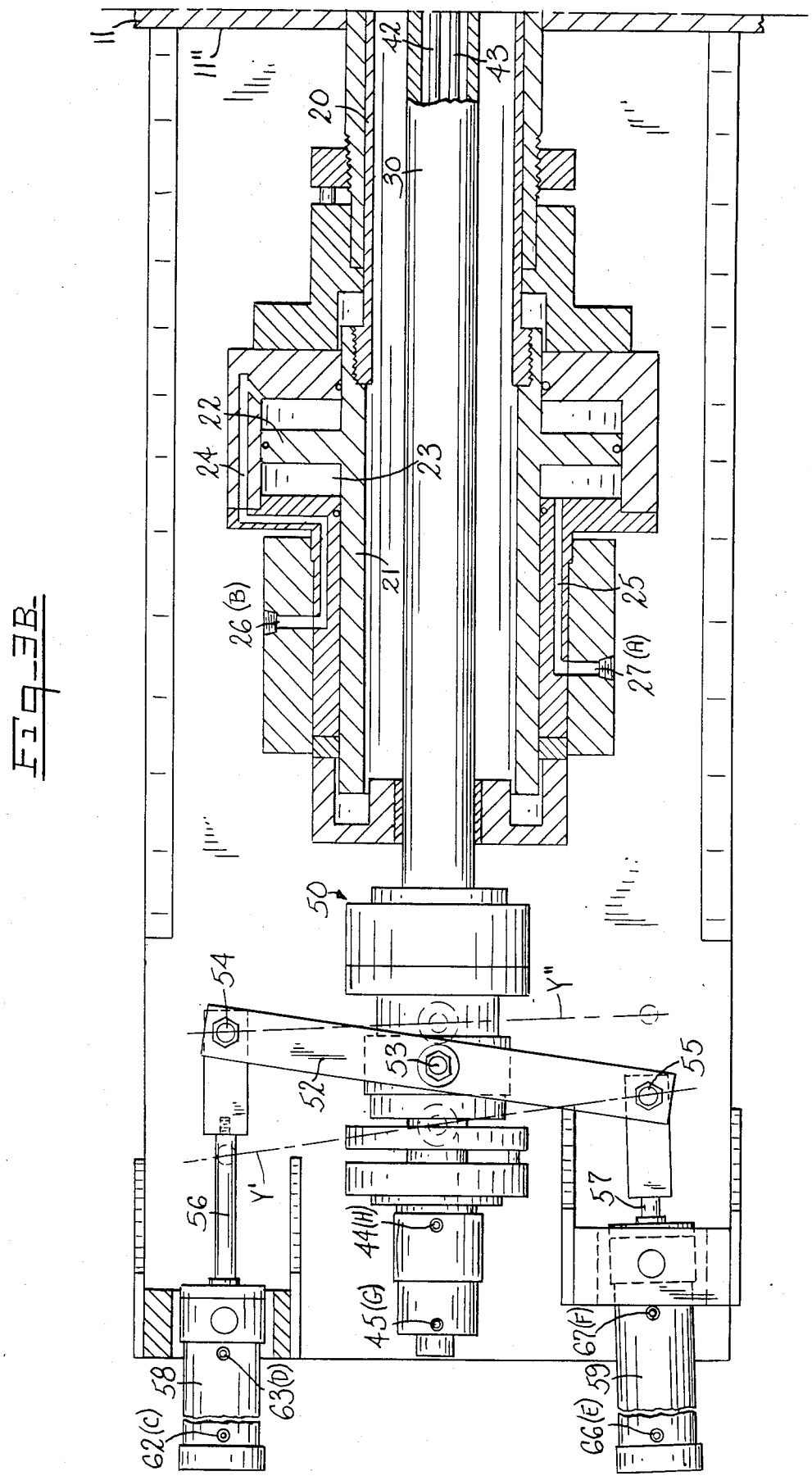

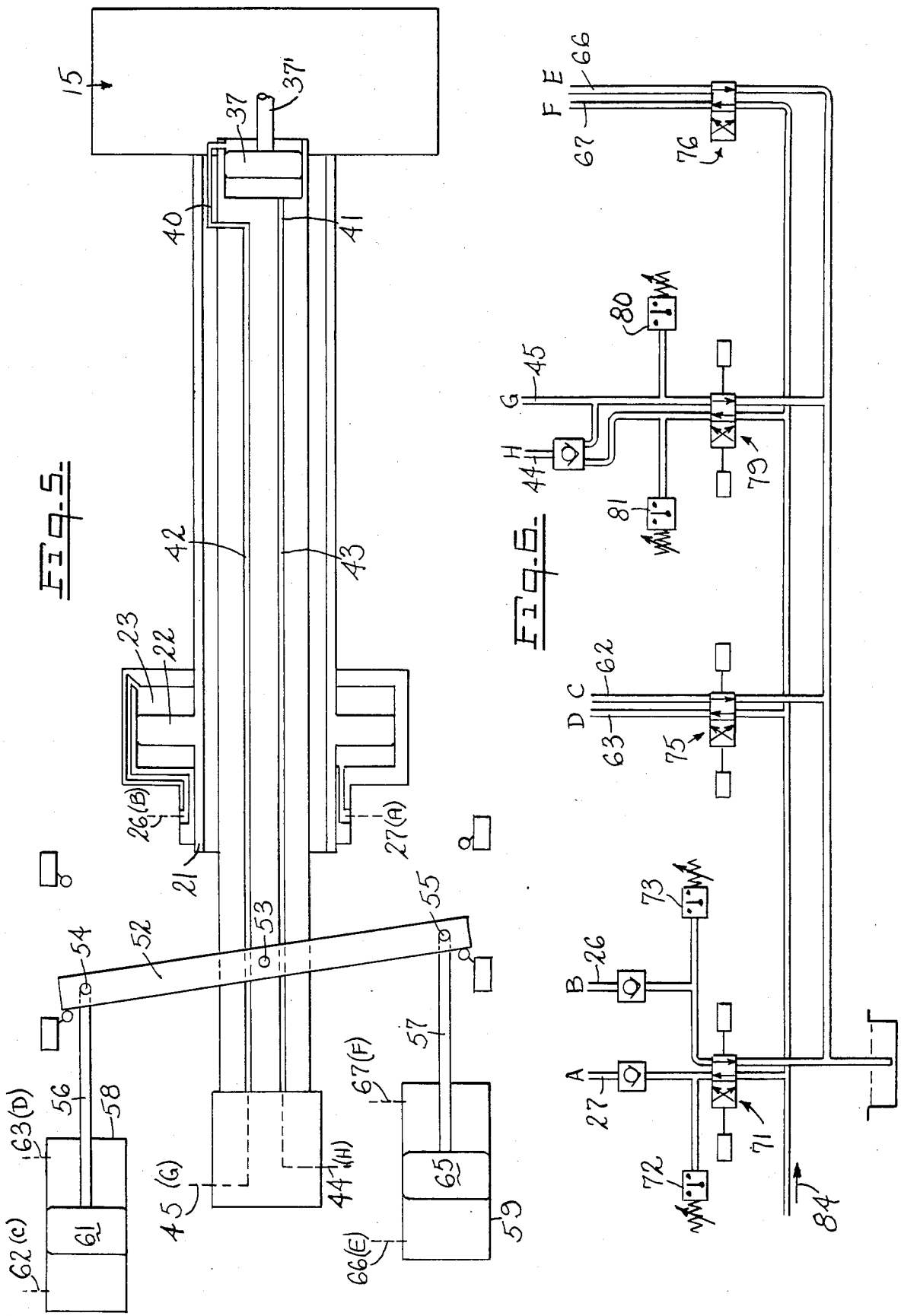

TWO STAGE CHUCK

This invention relates to a two stage chuck for a lathe, the chuck being adapted to support a work-piece in a manner to permit the machining of the full I.D., full O.D., and front and back faces to a finished width of a part which requires both O.D. and through boring finishing in one operation.

Annular machine parts, such as the inner and outer races of ball or roller bearings, require finishing to extremely accurate tolerances. This can be effected most efficiently in a lathe where a work-piece, held in the chuck and rotated, can be acted on by cutting tools. Since annular race bearings normally require machining on I.D. through boring and O.D. surfaces, while maintaining precise concentricity, it is most advantageous to provide a lathe capable of effecting the complete internal and external machining without intervening removal of the work-piece.

It is accordingly an object of the invention to provide a lathe, wherein, in a first stage, the work-piece is gripped peripherally in the jaws of a power chuck for interior machining, the work-piece being then transferred, through an intermediate stage, to a firm support on an expansible mandrel, for exterior machining in a second (final) stage. The work-piece may be manually or automatically fed to the chuck jaws to start the operation and manually or automatically removed from the mandrel at its conclusion.

It is further object of the invention to provide a lathe assembly wherein all operations can be programmed and performed serially on a multiplicity of work-pieces without intervention by the operator.

It is yet another object of the invention to provide a lathe with means for holding work-piece in two stages such that all surfaces can be worked on.

It is a still further object of the invention to provide certain improvements in the form, construction and arrangement of the several parts whereby the above named and other objects may effectively be attained.

A practical embodiment of the invention is shown in the accompanying drawings wherein:

FIGS. 1A and 1B represent vertical sectional views, respectively, of the chuck end of the lathe assembly, and of the work-piece holding control portions of the same assembly, with the work-piece held in its first stage position;

FIGS. 3A and 3B represent horizontal sectional views otherwise similar to FIGs. 1A and B, showing the parts in an intermediate position;

FIG. 5 is a somewhat diagrammatic illustration of the hydraulic system for actuating the work-piece holding elements, and FIG. 6 is a schematic of the electro-hydraulic circuits associated with the system of FIG. 5.

Figure 1A:
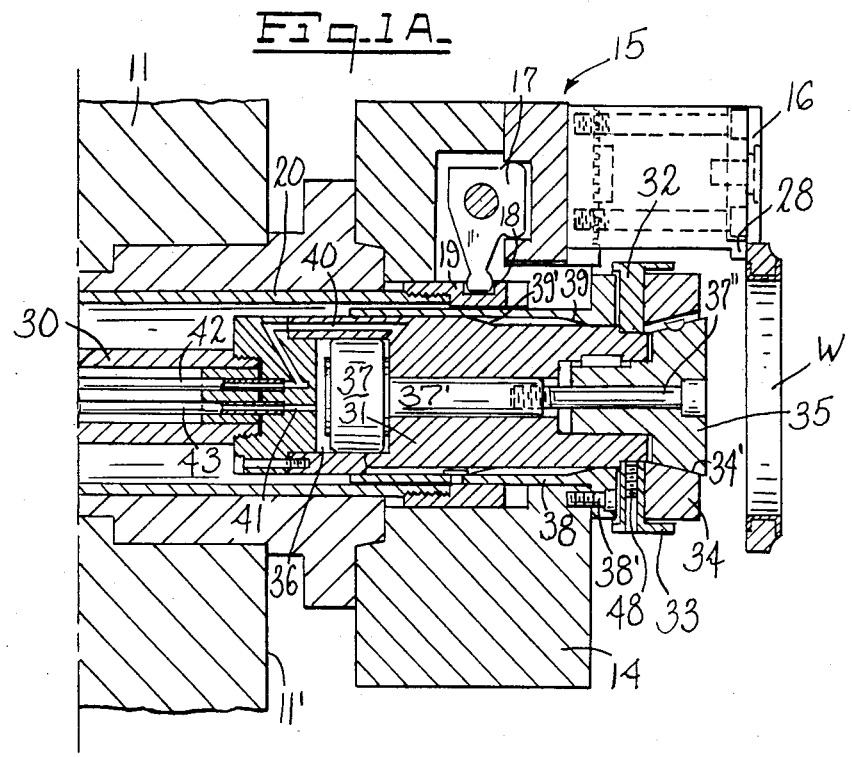

Referring to the drawings, a lathe (not shown) is provided with a headstock 11 having a front wall 11' and a rear wall 11" from which projects a rear support bracket 12 provided with inwardly extending cylinder mounting risers 13.

Figure 2:
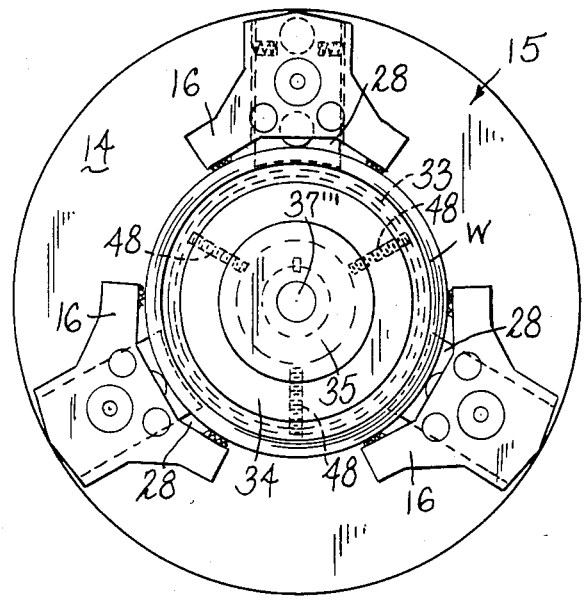
FIG. 2 represents a detail vertical elevation of the chuck face.

A power chuck, lever type with through hole, as manufactured by Royal, Cushman, S-P and others, is indicated generally at 15, the chuck having a body 14 and three jaws 16 (FIG. 2) each being movable radially by means of a lever 17 (bell crank), the actuating arm of which is engaged in a slot 18 in a collar 19 fixed to the forward end of an elongated first carrier tube 20. At its rear end the tube 20 is drivingly connected to the flanged cylindrical sleeve 21, the flange 22 of which acts as a piston within the annular hydraulic chamber 23. The front and rear sides of the chamber are connected through channels 24, 25, respectively, to ports 26, 27 (A,B) through which hydraulic fluid can be supplied (as explained below) to retract or advance the carrier tube and thus close or open the jaws 16 of the chuck.

Each jaw 16 is provided with a first locator 28 which may be in the form of a flat plate extending radially inward beyond the gripping faces of the jaw itself so that a work-piece W, such as an unfinished bearing race, can be held accurately in the position shown in FIG. 1A. When held in this position the work-piece can be subjected to machining by tools on the lathe (e.g., under tape control) to face, bore and partially back face the areas not being gripped by the jaws, as indicated by cross-hatching in FIGS. 1A and 2.

In order to effect a second stage of machining of the same work-piece, the lathe chuck assembly is provided with additional work-handling elements including a second locator, an expansible mandrel and operating means for these added parts.

A second carrier tube 30, supported coaxially within the tube 20, is provided at its forward end with a cylinder extension 31 which supports at its forward end the second locator in the form of a ring 32 having an annular flange 33 and a flat surface on which rests the annular expansible mandrel 34. The mandrel has a cylindrical outer surface and a frustoconic inner surface 34' against which rests the complementary-shaped beveled side of the mandrel expander 35. Within the extension 31 is a short cylindrical chamber 36 containing a piston 37 connected by piston rod 37' to the expander 35. Hydraulic fluid is conducted to chamber 36 on either side of piston 37, through channels 40, 41, tubes 42, 43 (within tube 30) and inlet-outlet ports 44, 45 (H,G).

Figure 4A:
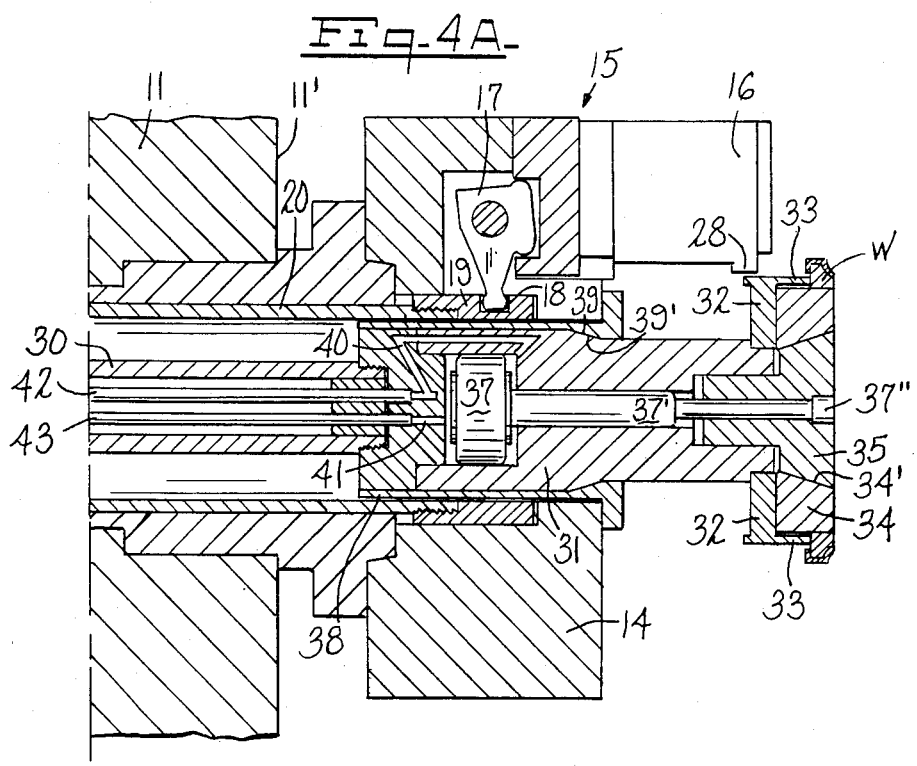
FIGS. 4A and 4B represent horizontal sectional views, similar to FIGS. 3A and 3B, showing the parts in the second stage position.

The cylindrical extension 31 is slidable axially in a forwardly flanged cylindrical sleeve 38 which is fixed by bolts 38' to the frame of the chuck 15. The bore of the sleeve is provided with a rearwardly facing annular beveled surface 39 which is adapted to be engaged by a complementary forwardly facing annular beveled surface 39' on the exterior of cylindrical extension 31. These beveled surfaces are spaced apart, as appears in FIG. 1A, when the mandrel is retracted, but are in firm engagement when the mandrel is advanced to the position shown in FIG. 4A, thus eliminating any lateral movement of the work-piece during the second stage machining.

The second locator, mandrel and expander are precisely sized to handle work-pieces of a specific diameter and can be replaced by larger or smaller similar elements to accomodate work-pieces of different sizes by releasing the screw 37" which secures the expander to the end of the piston rod and the set screw 48 in the locator ring 32. The movement of the mandrel, between relaxed and expanded states, is very slight and the stroke of the piston 37 may thus be correspondingly short.

Figure 3A:
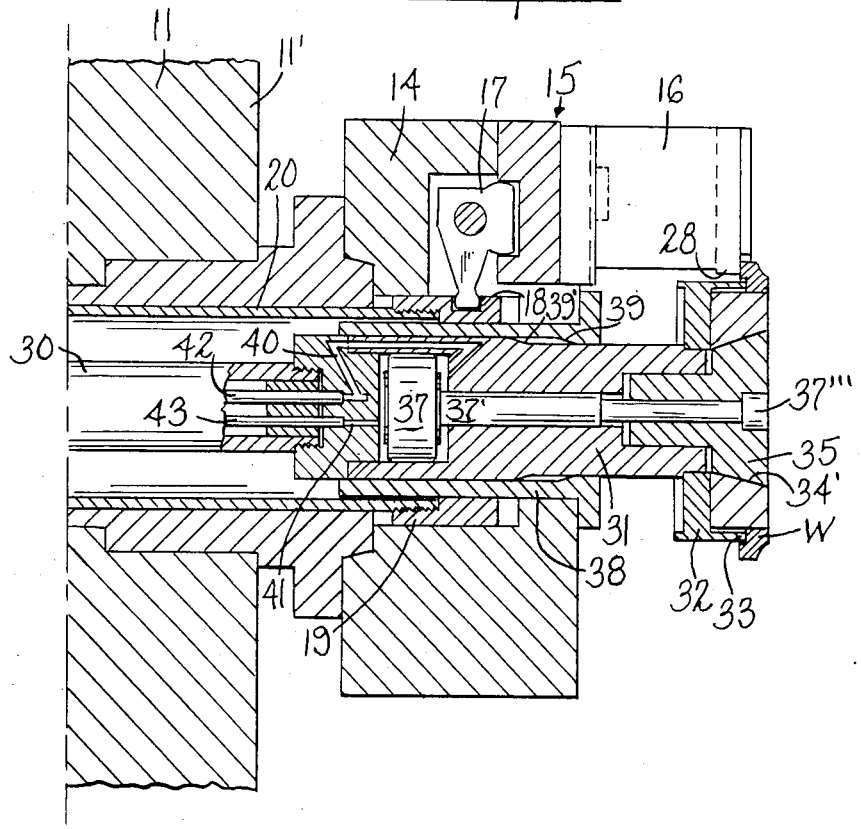
Figure 4B:
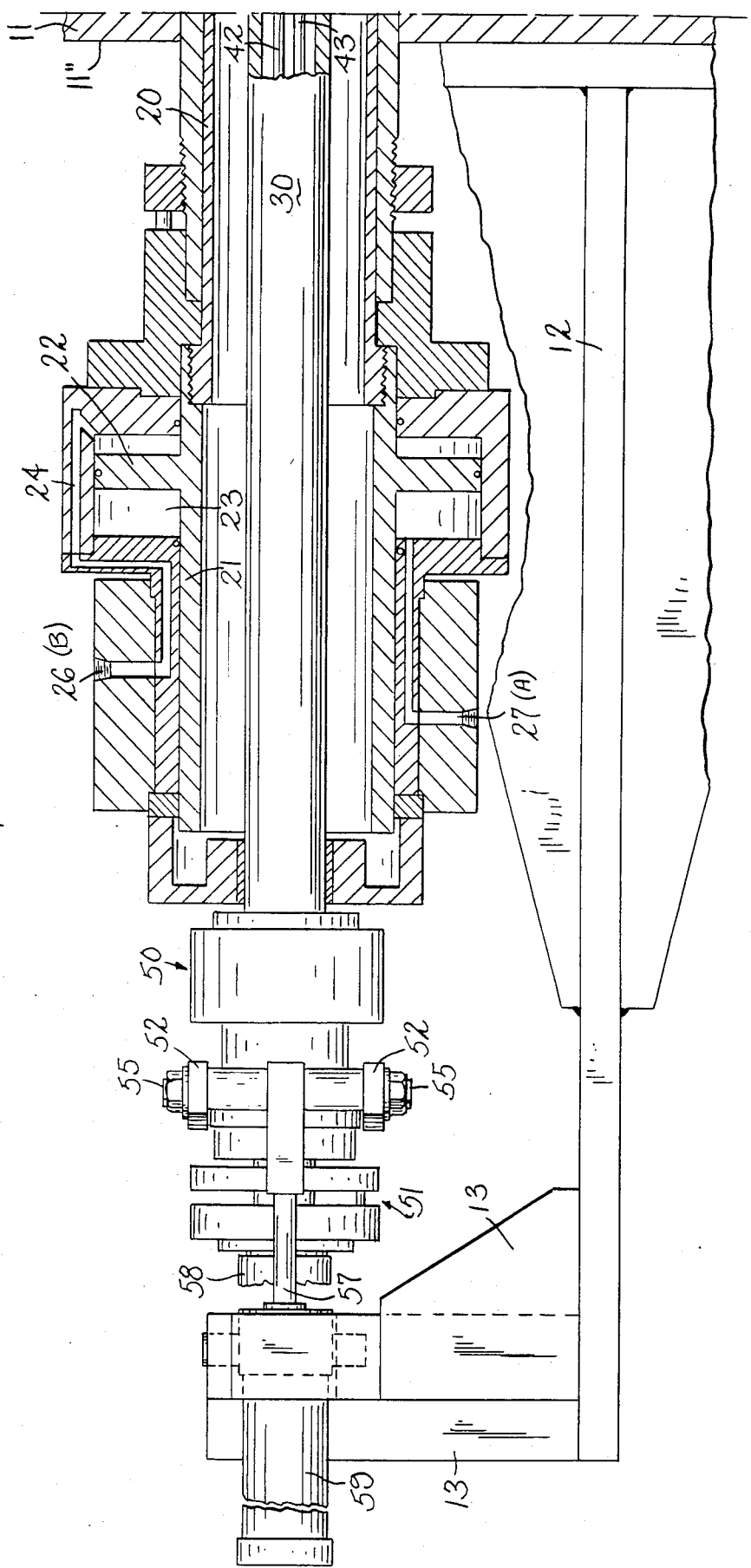

During the first stage machining of the work-piece the parts just described remain in the retracted positions shown in FIGS. 1A and 1B. Mechanism for advancing the second stage assembly into active positions, is shown at the left of FIGS. 1B and 3B. The rear end portion of the carrier tube 30 is supported in a high speed bearing 50 while the hydraulic tubes 42, 43 are connected to their respective ports 44, 45(H,G) through high speed rotating union 51 (e.g., Dueblin Model 2520-000 Deu-Plex). The carrier tube 30, bearing 50 and attachments are movable axially of the tube 20 by means of a transversely extending yoke 52 pivotably connected centrally at 53 to the bearing housing and having its ends secured by trunnions 54, 55 to the piston rods 56, 57 of a pair of hydraulic cylinders 58, 59. The stroke of one cylinder is preferably about twice that of the other cylinder (i.e., 4" to 2.6") for reasons explained below. The cylinders are supported on the risers 13 as shown in FIGS. 1B, 3B and 4B.

The piston 61 in cylinder 58 is advanced or retracted by fluid which is admitted through ports 62 or 63 (C or D) and the piston 65 in cylinder 59 is advanced or retracted by fluid admitted through ports 66 or 67 (E,F).

Referring to the schematic, FIG. 6, the hydraulic lines communicating with the lettered ports A to H are identified as 26, 27, 62, 63, 66, 67, 44 and 45. The chuck jaw open/close solenoid is indicated at 71, in association with the chuck open switch 72 and chuck close switch 73. The advance/retract solenoid for cylinder 58 is indicated at 75 and the similar advance/retract solenoid for cylinder 59 is indicated at 79 controlled by mandrel expand switch 80 and mandrel relax switch 81. A source of hydraulic fluid under pressure is indicated at 84.

The recommended sequence of operations is as follows:

1. In starting position the chuck jaws 16 are open and the mandrel 34 is fully retracted and relaxed.
2. Work-piece W is positioned against the first locators 28, hydraulic fluid enters port 26 in order to withdraw (retract) tube 20 which closes the jaws 16 against the work-piece W as shown in FIG. 1A.
3. The cutting tools (not shown) carried by the lathe are brought into position to face, bore and partially back face the work-piece, as the chuck assembly is rotated in a customary manner by a power source (not shown).
4. Hydraulic fluid is admitted to cylinder 58 through port 62 which causes cylinder piston 61 to advance the mandrel carrier tube 30 to the intermediate position shown in FIGS. 3A and 3B, the mandrel being within the work-piece bore and the second locator being in position against the back surface of the work-piece.
5. Hydraulic fluid is admitted to port 45 and travels through tube 42, retracting piston 37, which expands the mandrel 34 to grip the work-piece firmly by its "bore" surfaces (FIG. 3A).
6. Hydraulic fluid enters port 27, advancing the piston 22 and tube 20 in order to open the chuck jaws.
7. Hydraulic fluid enters cylinder 59 through port 66, thus moving piston 65 to advance the mandrel carrier tube 30 to its fully extended position (FIG. 4A) where all surfaces of the work-piece except the bore and part of the back face can be machined as needed (see hatched surfaces indicated in FIG. 4A).
8. Cutting tools on the lathe are adjusted to turn the O.D. and partially back face the work-piece, completing the back facing operation.
9. Hydraulic fluid enters port 44 and travels through tube 43 and channel 41 to chamber 36 where the piston 37 is advanced in order to relax the mandrel, as in FIG. 1A. Work-piece is manually or automatically unloaded from mandrel.
10. Hydraulic fluid enters ports 63 and 67, causing pistons 61 and 65 in cylinders 58 and 59 to retract the mandrel carrier tube 30, returning the chuck to the starting position.

The operations described in steps numbered 4 and 7 above are illustrated in FIG. 3B where the axis of yoke 52 in mandrel retracted position is indicated by broken line Y', the intermediate position is shown in full lines and the yoke axis for mandrel advanced position is indicated by the broken line Y". The difference in throw lengths of the pistons 56 and 57 is apparent from the angularity of the broken lines. To permit compensation between the arcuate movement of the trunnions 54, 55 and the normal straight line movement of the pistons 56, 57, the cylinders 58, 59 may be so mounted that slight rocking is permitted.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A chuck assembly adapted to be mounted for rotation and axial movement in relation to the headstock of a lathe, comprising:
    a chuck having a body and a plurality of radially movable jaws adapted in a first machining position of the chuck to grip the periphery of an annular work-piece;
    a work-piece locating means associated with each jaw;
    an axially movable jaw actuating means;
    a first hydraulic means adapted to move said actuating means to and from work-piece gripping position;
    an expansible mandrel adapted for movement from a retracted first position to an advanced intermediate position in the bore of the annular work-piece;
    an axially movable support for said mandrel;
    a second hydraulic means for moving the mandrel from said first position to said intermediate position;
    a third hydraulic actuated means for expanding said mandrel in said bore to engage the work-piece;
    means causing said first hydraulic means to move the jaws to work-piece releasing position;
    means causing said second hydraulic means to move the mandrel and work-piece from the intermediate position to a second machining position of the chuck, and
    means causing said third hydraulic means to release the work-piece.

2. A chuck assembly according to claim 1 which includes means for locking the mandrel support in engagement with the chuck body.

3. A chuck assembly according to claim 1 wherein the jaw actuating means includes an elongated first carrier tube and the mandrel support includes a second elongated carrier tube, positioned coaxially within the first carrier tube.

4. A chuck assembly according to claim 3 wherein the first hydraulic means is constituted by an annular chamber surrounding said first carrier tube and an annular flange on said first carrier tube is arranged to constitute a piston in said chamber.

5. A chuck assembly according to claim 3 wherein the second and third hydraulic means are constituted by a transverse member pivotally connected to the mandrel support and hydraulic cylinders connected to said member and actuatable for moving the mandrel support to each of said positions.

* * * * *